(12) United States Patent
Leatherland et al.

(10) Patent No.: US 9,279,405 B2
(45) Date of Patent: Mar. 8, 2016

(54) POWERTRAIN CONTROL SYSTEM

(71) Applicant: JAGUAR LAND ROVER LIMITED, Warwickshire (GB)

(72) Inventors: Adam Leatherland, Coventry (GB); Baptiste Bureau, Coventry (GB); Scott Balder, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/428,095

(22) PCT Filed: Sep. 17, 2013

(86) PCT No.: PCT/EP2013/069288
§ 371 (c)(1),
(2) Date: Mar. 13, 2015

(87) PCT Pub. No.: WO2014/044679
PCT Pub. Date: Mar. 27, 2014

(65) Prior Publication Data
US 2015/0233336 A1    Aug. 20, 2015

(30) Foreign Application Priority Data
Sep. 19, 2012 (GB) .................................. 1216732.6

(51) Int. Cl.
*B60G 17/018* (2006.01)
*F02N 11/08* (2006.01)
(Continued)

(52) U.S. Cl.
CPC ........ *F02N 11/0833* (2013.01); *B60G 17/0165* (2013.01); *B60G 17/0195* (2013.01)

(58) Field of Classification Search
USPC ............... 180/271; 280/5.514; 701/37, 48, 54
See application file for complete search history.

(56) References Cited

U.S. PATENT DOCUMENTS

| | | | | |
|---|---|---|---|---|
| 6,219,601 | B1 * | 4/2001 | Shono | B60G 17/016 701/36 |
| 6,282,470 | B1 * | 8/2001 | Shono | B60G 17/015 180/41 |
| 2014/0067154 | A1 * | 3/2014 | Yu | B60W 40/076 701/1 |

(Continued)

FOREIGN PATENT DOCUMENTS

| | | |
|---|---|---|
| DE | 102010013179 A1 | 9/2011 |
| EP | 1355209 A1 | 10/2003 |

(Continued)

OTHER PUBLICATIONS

"Stop/Start," Freelander 2—Owner's Handbook, Land Rover Technical Communications, Publication Part No. LRL 10 02 56 101, Jan. 1, 2009, pp. 100-101, XP002686551.

(Continued)

*Primary Examiner* — Toan To
(74) *Attorney, Agent, or Firm* — Carlson, Gaskey & Olds

(57) ABSTRACT

The present invention relates to a powertrain control system (1) for a motor vehicle. The vehicle comprises an internal combustion engine (5) and an adjustable suspension system (9) operable in accordance with first and second ride height settings, said settings being associated with respective first and second vehicle ride heights. The powertrain control system (1) comprises a stop/start controller (11) for issuing an engine stop request signal and an inhibitor (15) for inhibiting operation of the stop/start controller (11) in dependence on a selected ride height setting.

18 Claims, 2 Drawing Sheets

(51) Int. Cl.
*B60G 17/0195* (2006.01)
*B60G 17/0165* (2006.01)

(56) References Cited

U.S. PATENT DOCUMENTS

| | | | | |
|---|---|---|---|---|
| 2014/0358382 | A1* | 12/2014 | Kou | E21C 47/00 701/50 |
| 2015/0046070 | A1* | 2/2015 | Awadi | F02D 17/04 701/112 |
| 2015/0266467 | A1* | 9/2015 | Mansur | B60W 10/06 701/22 |

FOREIGN PATENT DOCUMENTS

| | | |
|---|---|---|
| GB | 2412448 A | 9/2005 |
| GB | 2486453 A | 6/2012 |

OTHER PUBLICATIONS

International Search Report for International application No. PCT/EP2013/069288 mail Dec. 5, 2013.

Combined Search and Examination Report under Sections 17 and 18(3) for Application No. GB1216732.6 dated Jan. 9, 2013.

* cited by examiner

POWERTRAIN CONTROL SYSTEM

TECHNICAL FIELD

The present invention relates to a powertrain control system for a motor vehicle comprising an internal combustion engine and an adjustable suspension system, to a motor vehicle and a method of operating the same.

BACKGROUND

It is known to provide motor vehicles with an engine stop/start system with a view to improving fuel economy. The stop/start system is designed to turn the engine off automatically when pre-defined engine-stop conditions are met, e.g. that the vehicle is being held stationary with a driver-operated brake pedal depressed. The condition in which the vehicle is held stationary with the engine automatically switched off during a drive cycle is known as an 'eco-stop' condition.

When the driver releases the brake pedal the engine may be restarted and transmission of torque to the drive wheels of the vehicle may be re-engaged. That is, under 'no fault' normal operating conditions, release of the brake pedal by the driver triggers the engine to be restarted, the driveline to be closed and torque to be transmitted to the drive wheels. The condition of restarting the engine during a drive cycle is known as an 'eco-start' condition.

Whilst it is acceptable to stop and start the engine in this manner during normal operation of a vehicle, the Applicant has recognised that it can compromise composure of the vehicle and prove unsettling for the driver in certain circumstances, for example when driving an off-road vehicle over steep and/or undulating terrain especially when driving across difficult off-road terrain.

The present invention sets out to address the afore-mentioned shortcoming.

SUMMARY OF THE INVENTION

According to one aspect of the present invention, there is provided a powertrain control system for a motor vehicle comprising an internal combustion engine and an adjustable suspension system operable in accordance with first and second ride height settings, said settings being associated with respective first and second vehicle ride heights; the powertrain control system comprising:

a stop/start controller for issuing an engine stop request signal; and an inhibitor for inhibiting operation of the stop/start controller in dependence on a selected ride height setting.

The stop/start controller can operate to improve fuel economy by stopping the engine when certain pre-defined criteria have been satisfied, for example the vehicle is stationary and the driver is in the vehicle. However, under certain conditions it may be inconvenient for the stop/start controller to intervene, as this may cause driver alarm or adversely affect the driver's control of the vehicle, for example when driving off-road. The selection of a particular ride height setting may be indicative of a change in the driving conditions/environment or indicate that the driver is about to perform a manoeuvre in which engine stop/start would be inconvenient. Accordingly, the inhibitor can advantageously prevent or restrict operation of the stop/start controller in dependence on a selected ride height setting. It will be appreciated that the user is free to stop the engine manually irrespective of which drive range is selected in the transmission.

As mentioned above, the selection of a particular ride height setting can be used advantageously as an indicator of the driver's intention to drive the vehicle in conditions in which the automatic switching off of the engine by the stop/start controller would be inconvenient or potentially detrimental to the operation of the vehicle. For example, the selection of an elevated, or maximum, ride height setting may indicate that the driver intends to drive the vehicle through a body of water. Accordingly, in dependence on such a selection being made, the stop/start controller can be inhibited. In this way, during a so-called 'wading' event, the risk of water ingress into the vehicle exhaust pipe may be mitigated because the stop/start controller will be inhibited thereby ensuring that the engine will remain running. Similarly, the selection of an elevated vehicle ride height setting may be taken as an indication that the driver intends to drive across rough and/or uneven terrain. Thus, by inhibiting the stop/start controller in dependence on the ride height setting, the risk of driver alarm being caused by the engine being stopped by the stop/start controller when the vehicle is brought to a standstill on uneven, off-road terrain may be mitigated. Moreover, the selection of a reduced, or minimum, ride height setting may be taken as an indication that the driver intends to drive in a 'sporty' style. Accordingly, any inconvenience which may be associated with the engine being switched off by the stop/start controller when the driver wishes to accelerate from standstill can be obviated by inhibiting the stop/start controller.

The inhibitor may be operable to permit operation of the stop/start controller when the first ride height setting is selected and to inhibit operation of the stop/start controller when the second ride height setting is selected. The second ride height setting may be associated with a greater ride height than the first ride height setting. In one aspect, the second ride height setting corresponds to an 'off-road' ride height setting. The 'off-road' ride height setting may correspond to selection of the maximum ride height allowed by the suspension system.

The stop/start controller may be configured to issue an engine running signal if the second ride height setting is selected when the engine has been stopped by the stop/start controller.

The powertrain control system may comprise ride height selection means operable to output a control signal indicating that the second ride height setting has been selected. The inhibitor may be configured to inhibit operation of the stop/start controller upon receipt of said control signal from the ride height selection means.

If the engine has been stopped by the stop/start controller and the second ride height setting is selected (while the engine is stopped in said eco-stop mode), an engine running signal can be sent to re-start, or permit manual re-start of the engine. A check is typically performed to ensure that any stop/start system conditions for starting the engine are satisfied before sending the engine running signal. The inhibitor can subsequently inhibit operation of the stop/start controller while the second ride height setting is selected.

The powertrain control system may comprise a terrain optimisation selector for activating one of a plurality of pre-configured powertrain operating modes. The operating modes can, for example, be configured for one or more of the following types of terrain: Normal; Grass, Gravel & Snow; Sand, Mud & Ruts; Snow; and Rock Crawl. The operating modes may, for example, provide different throttle responses and/or include selecting a low range in the transmission. At least one of said pre-configured powertrain operating modes may include selecting the second ride height setting. The inhibitor may be configured to inhibit operation of the stop/start controller when the terrain optimisation selector activates said at least one pre-configured powertrain operating mode which includes selecting the second ride height setting.

The inhibitor may be provided in said stop/start controller; or the inhibitor may be separate from the stop/start controller.

The powertrain control system may comprise a processor for monitoring one or more driving characteristics of the vehicle to determine when the second ride height setting should be selected. The processor can, for example, be connected to a CAN bus to obtain information, such as one or more of the following: vehicle speed; engine speed; throttle position; road roughness; selected ride height mode and transmission/drive state. Utilising this data, the processor can determine when it would be appropriate to select the second ride height setting. For example, the processor may compare the measured operational states with stored threshold data, for example stored in a look-up table. The inhibitor may be configured to inhibit operation of the stop/start controller when the processor determines that the second ride height setting should be selected. A notification may be provided to alert the driver (for example, via a message notification displayed on a human-machine interface of the motor vehicle) that the second ride height setting should be selected and/or that start/stop operation will be inhibited as a result of selecting second ride height setting.

By way of example, an eco-stop can be initiated when the vehicle is brought to a stop (starting from a speed greater than four (4) kph); and/or sufficient brake pressure is applied to ensure the vehicle is stationary. Alternatively, the eco-stop can be initiated when the vehicle is stationary and either the Neutral or Park drive mode is selected.

Furthermore, the engine eco-start can be initiated when one or more of the following conditions have been met: (a) the brake pedal is released (typically in drive or sport modes); (b) reverse is selected; (c) the accelerator is pressed; or (d) an automatic restart occurs. The engine can complete an automatic restart for one or more of the following reasons: interior cabin temperature requires climate control (for example due to a significant increase or decrease in the interior temperature); the windscreen begins to mist; the battery state of charge is low; the brake vacuum has been reduced (for example due to repeated presses of the brake pedal with the engine off); the vehicle speed increases over one (1) kph; or the stop/start system is deactivated.

According to another aspect of the present invention, there is provided a method of operating a motor vehicle comprising an internal combustion engine and an adjustable suspension system, the method comprising:

operating the engine in a stop/start mode when a first ride height setting is selected for the suspension system; and
inhibiting the stop/start mode when a second ride height setting is selected for the suspension system.

The engine may be re-started if the second ride height setting is selected while the engine has been stopped by the stop/start mode.

Pre-configured powertrain operating modes may be selectable by a user; the stop/start mode being inhibited when a pre-configured operating mode is activated which is configured to select the second ride height setting for the suspension system.

The method may comprise monitoring one or more driving characteristics of the vehicle and inhibiting the stop/start mode when it is determined that the second ride height setting of the suspension system should be selected.

According to a further aspect of the present invention, there is provided a vehicle comprising an internal combustion engine, an adjustable suspension system and a powertrain control system as described above.

The powertrain control system can be implemented in hardware, software or a combination of hardware and software. The powertrain control system can comprise one or more computational processors configured to perform the referenced functions. The processor(s) can be connected to one or more data storage devices, such as read only memory (ROM), storing computational instructions. Equally, the method(s) described herein can be performed by one or more computational processors.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying drawings, in which.

DETAILED DESCRIPTION

Figure 1:
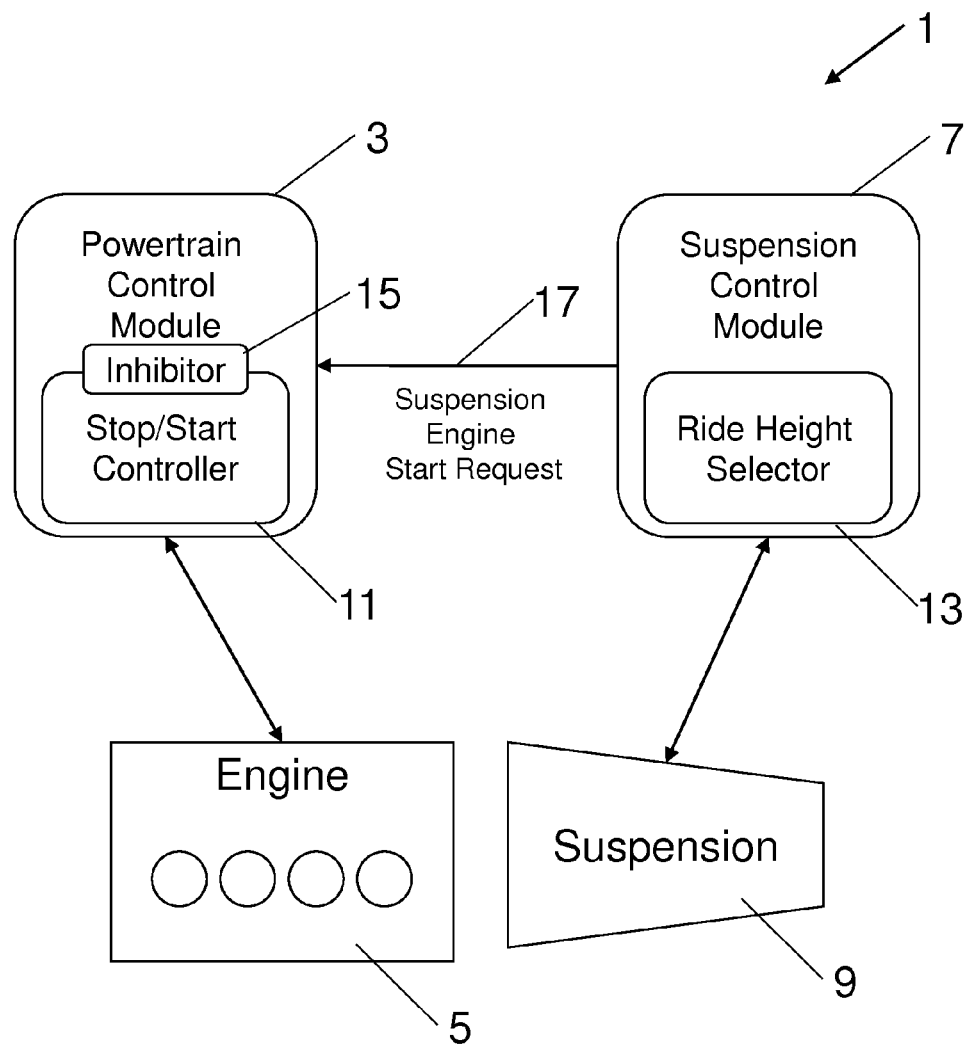
FIG. 1 shows a schematic overview of a powertrain control system for a motor vehicle according to an embodiment of the present invention.

Referring to FIG. 1, the powertrain control system 1 comprises a powertrain control module (PCM) 3 for controlling an internal combustion engine 5 and a suspension control module (SCM) 7 for controlling a suspension system 9.

In the presently described embodiment, the motor vehicle in which the powertrain control system 1 is installed is a 4×4 vehicle capable of operating off-road and the suspension system 9 is an air suspension system which allows the ride height of the motor vehicle to be adjusted. In more detail, the air suspension system 9 comprises an air bag or bellows incorporated in the linkage between each of the vehicle wheels and the vehicle chassis or vehicle body. Compressed air is supplied to each of the bellows by means of an air compressor pump. With this configuration, the position of the chassis relative to the wheels, and thus the height of the body relative to the ground, can be adjusted in dependence on the pressure of the air in the respective bellows.

A ride height selector 13, such as a lever or button, is provided to allow a user to select one or more ride height settings. In the case of the 4×4 motor vehicle of the presently described embodiment the ride height settings selectable by the driver may include one or more of:

a 'normal' setting for on-road use in which the ride height is selected so as to provide the optimum compromise between a compliant ride and minimising aerodynamic drag and body roll;

an 'off-road' setting, in which the ride height is elevated with respect to the 'normal' setting so as to permit greater ground clearance of the body with respect to the terrain that the vehicle traverses;

an 'access' setting in which the ride height is lowered with respect to the 'normal' setting so as to aid ingress and egress of vehicle occupants and facilitate loading of luggage or cargo into the vehicle; and/or a performance orientated or 'sport' setting in which the ride height is lowered with respect to the 'normal' setting so as to further reduce aerodynamic drag and body roll and to enhance high speed stability.

The 'off-road' setting may correspond to the maximum permissible ride height allowed by the suspension system 9. Alternatively, it may correspond to a nominal elevated ride height which is selected so as to provide increased ground clearance whilst allowing some additional movement of the wheels relative to the chassis so as to maintain a suitably compliant ride and avoid excessive stresses from being applied to components of the suspension system such as the air bellows, suspension linkages, dampers, etc.

The 'normal' setting may be used for normal road driving and also for off-road driving across substantially level terrain. The 'off-road' setting may be used for low speed manoeuvring, such as negotiating steep or uneven surfaces or boulder strewn terrain.

It will be appreciated by those skilled in the art that, for a given ride height setting of the suspension system 9, the actual position of the each wheel of the vehicle relative to the vehicle body will vary as the vehicle is driven. For example, when the vehicle is driven over rough ground the position of any given wheel with respect to the body may increase, when the wheel traverses a hole in the ground or decrease when the wheel traverses a rock or the like. Accordingly, the ride height of the vehicle for a particular ride height setting may be taken as the height above the ground of a reference point on the body when the vehicle is stationary on flat, level ground.

The powertrain control module 3 has a stop/start controller 11 configured to turn the engine 5 off (a so-called eco-stop) when predefined engine-stop conditions are satisfied, for example the vehicle is being held stationary and the driver is in the car. The stop/start controller 11 requests the engine 5 to start for continued operation when predefined engine-start conditions are satisfied subsequently, for example release of the brake pedal.

The suspension control module 7 is operable to control the suspension system 9 in dependence on the ride height setting input via the ride height selector 13. In response to a particular ride height setting being selected, the suspension control module 7 outputs a control signal to the air compressor pump so that each of the respective air bellows are pressurised so as to achieve the desired ride height. Furthermore, the ride height selector 13 outputs a ride height signal to the power control module 3 to indicate the selected ride height setting. The ride height signal can be supplied via a CAN bus (not shown) for access by the other vehicle systems.

The powertrain control system 1 comprises an inhibitor 15 configured to inhibit operation of the stop/start controller 11 when the suspension system 9 is operating in an 'off-road' or 'elevated' ride height setting. The ride height signal output from the ride height selector 13 enables the powertrain control module 3 to determine the currently selected ride height setting of the vehicle. When the ride height selector 13 outputs a signal indicating that the 'off-road' ride height setting has been selected, the stop/start controller 11 is inhibited by the inhibitor 15 to prevent engine stop request signals being transmitted. The stop/start controller 11 can, for example, be disabled by the inhibitor 15. Only when the powertrain control module 3 determines that the 'off-road' setting has been de-selected (e.g. as the result of the 'normal' mode being selected instead) is the stop/start controller 11 activated.

The suspension control module 7 can also communicate with the powertrain control module 3, for example via the CAN bus. The suspension control module 7 can generate an engine running request signal 17 which is transmitted to the powertrain control module 3 to start the engine 5. The engine running request signal 17 is generated when the engine has been stopped by the stop/start controller 11 and, whilst the engine 5 remains stopped in the eco-stop, the ride height selector 13 outputs a signal indicating that the 'off-road' ride height setting has been selected. Provided the predefined start-up conditions are satisfied, the stop/start controller 11 will request to restart the engine 5 in response to the engine running request signal 17 from the suspension control module 7. Alternatively, in dependence on user-preferences, the system may permit manual re-starting of the engine. The inhibitor 15 subsequently inhibits operation of the stop/start controller 11 while the 'off-road' ride height setting is selected.

The powertrain control system 1 may optionally comprise a terrain optimisation selector (not shown) for activating one of a plurality of powertrain operating modes. The powertrain operating modes are pre-configured to match the operating characteristics of the powertrain to a particular terrain type, such as: Normal (also referred to as 'Special Programs Off' or 'SPO'; Grass, Gravel & Snow; Sand, Mud & Ruts; Snow and Rock Crawl. The operating modes may, for example, specify different throttle response settings. Moreover, the powertrain operating modes can provide the suspension control module 7 with instructions to select a particular ride height setting of the suspension system 9. By way of example, a powertrain operating mode configured for traversing rocks (so-called "rock crawling") might require that the 'off-road' or 'maximum' ride height is selected, combined with a rapid throttle response to provide rapid acceleration/deceleration albeit at low speeds.

When a powertrain operating mode is activated which requires that the 'off-road' is selected, the inhibitor 15 is activated to inhibit operation of the stop/start controller 11. For example, selecting a powertrain operating mode which selects an elevated ride height may cause a control signal to be sent automatically to the inhibitor 15 to inhibit operation of the stop/start controller 11.

Figure 2:
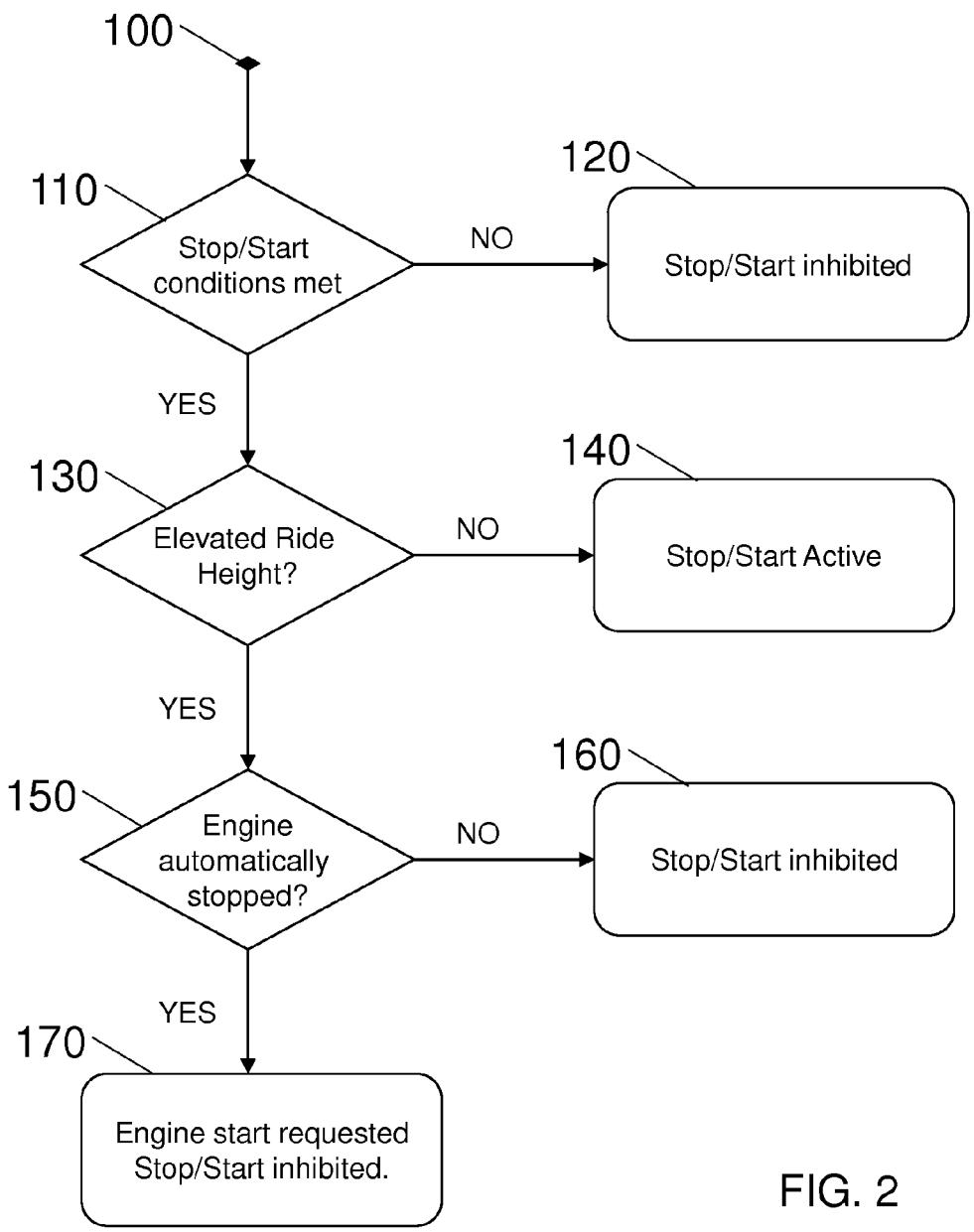
FIG. 2 shows a flow diagram for operation of the powertrain control system in accordance with an embodiment of the present invention.

The operation of the powertrain control system 1 will now be described with reference to the flow chart shown in FIG. 2.

The engine 5 is initially operating in conventional manner (STEP 100). A first check (STEP 110) is performed to determine if the engine stop conditions and/or the engine start conditions have been satisfied. The stop conditions in the present embodiment consist of checking that the vehicle is being held stationary and that the driver is in the vehicle. If the stop conditions are not satisfied, for example because the vehicle is moving, operation of the stop/start controller 11 is inhibited (STEP 120) and the engine continues to operate.

If the stop/start conditions have been satisfied, for example the vehicle comes to a halt and is held stationary, a second check (STEP 130) is initiated to determine if the 'off-road' ride height setting is selected. Specifically, the CAN bus is interrogated to determine if the ride height selector 13 has output a signal indicating that the 'off-road' setting has been selected.

If such a signal is not detected, the stop/start controller 11 is activated (STEP 140) and an engine stop request signal generated to stop the engine 5.

If a signal indicating that the 'off-road' setting has been selected is detected, a third check (STEP 150) is performed to determine if the engine 5 has been stopped by the stop/start controller 11 in an eco-stop. If the engine 5 has not been stopped by the stop/start controller 11, the operation of the stop/start controller 11 is inhibited (STEP 160).

If the stop/start controller 11 has stopped the engine 5 and the engine remains stopped when the 'off-road' setting is selected, the engine start request signal 17 is generated to start the engine (STEP 170). The operation of the stop/start controller 11 is again inhibited whilst the 'off-road' setting is selected.

Once the 'normal' ride height setting is selected, provided the other criteria are satisfied, the stop/start controller 11 is activated for use in conventional manner.

In light of the foregoing, it will be appreciated that the present invention can inhibit operation of the stop/start controller 11 when the 'off-road' ride height setting is selected for the suspension system 9. By inhibiting the operation of the stop/start controller 11 when the 'off-road' setting is selected, the engine will be prevented from undergoing an eco-stop when the vehicle may be traversing difficult terrain. Moreover, if the engine has already been stopped by the stop/start controller 11 and the 'off-road' setting is selected, the engine will be restarted and operation of the stop/start controller 11 inhibited.

The powertrain control module 3 and the suspension control module 7 are implemented on one or more electronic microprocessors. Likewise, the stop/start controller 11, the ride height selector 13 and the inhibitor 15 can be implemented on one or more electronic microprocessors.

It will be appreciated that the system may be provided with means for manually overriding intervention of stop-start whilst operating the vehicle in 'off-road' setting. Such means may be provided by a manual control such as a switch or lever, or may be provided by means of a touch screen and a graphical user interface displayed thereon and operable by the user operating the vehicle. The provision of means for manually overriding the system of the present invention may prove useful in certain types of vehicle operation, or to temporarily overcome a vehicle response to a component malfunction. In particular, the means for manually overriding the system of the present invention may advantageously be used as a service or fault diagnosis mode to test sub-system function during routine maintenance. It will be appreciated that various changes and modifications can be made to the arrangement described herein within departing from the scope of the present invention.

Although the suspension system 9 in the above-described embodiment is an air suspension system, it will be appreciated that the present invention may be employed with any suspension system which enables the vehicle ride height to be adjusted. For example, the suspension system may be a hydro-pneumatic system. Alternatively, the suspension system may employ a magneto-rheological system in which the ride height of the vehicle may be adjusted by varying the viscosity of a magneto-rheological fluid.

Furthermore, although the above-described embodiment of the invention addresses, inter alia, the problem of preventing driver alarm which may be caused an eco-stop occurring while the vehicle is being driven across difficult off-road terrain by inhibiting a stop/start functionality when an 'off-road' or 'maximum' ride height setting is selected, there are other situations in which it may be advantageous to inhibit stop/start functionality in dependence on a vehicle ride height setting. For example, in the case of a vehicle having a 'sport' setting or the like, in which the vehicle ride height is lowered with respect to a 'normal' ride height setting, it may be an advantage to inhibit stop/start functionality. In more detail, the selection of the 'sport' setting by a driver may indicate that the vehicle is being driven in a situation where it is not desirable for an eco-stop or eco-start to be performed, e.g. if the vehicle is being driven on a racetrack where an eco-stop of the engine would adversely affect the acceleration of the vehicle from a standing start.

Moreover, the present invention may be employed in vehicles other than 4×4 off-road vehicles. For example, a sports car having a relatively low ground clearance may be equipped with an adjustable suspension system to enable the ride height of the car to be increased to allow it to negotiate obstacles, such as speed bumps or the like, without causing damage to the chassis or parts of the vehicle trim. Accordingly, the selection of an elevated ride height setting indicates that the driver is about to perform a manoeuvre to negotiate an obstacle during which it would be inconvenient for an eco-stop to be performed, as this may cause the driver undue alarm or adversely affect the driver's control of the vehicle. Under these circumstances, an embodiment of the present invention is operable so as to inhibit a stop/start functionality of the vehicle whilst the elevated ride height setting is selected.

The invention claimed is:

1. A powertrain control system for a motor vehicle comprising an internal combustion engine and an adjustable suspension system operable in accordance with first and second ride height settings, said settings being associated with respective first and second vehicle ride heights; the powertrain control system comprising:
   a stop/start controller for issuing an engine stop request signal; and
   an inhibitor for inhibiting operation of the stop/start controller in dependence on a selected ride height setting.

2. A powertrain control system according to claim 1, wherein the inhibitor is operable to permit operation of the stop/start controller when the first ride height setting is selected and to inhibit operation of the stop/start controller when the second ride height setting is selected.

3. A powertrain control system according to claim 1, wherein the second ride height setting is associated with a greater ride height than the first ride height setting.

4. A powertrain control system according to claim 1, wherein the stop/start controller is configured to issue an engine running signal if the second ride height setting is selected when the engine has been stopped by the stop/start controller.

5. A powertrain control system according to claim 4, comprising ride height selection means operable to output a control signal indicating that the second ride height setting has been selected.

6. A powertrain control system according to claim 5, wherein the inhibitor is configured to inhibit operation of the stop/start controller upon receipt of said control signal from the ride height selection means.

7. A powertrain control system according to claim 1, comprising a terrain optimisation selector for activating one of a plurality of pre-configured powertrain operating modes.

8. A powertrain control system according to claim 7, wherein at least one of said pre-configured powertrain operating modes includes selecting the second ride height setting.

9. A powertrain control system according to claim 8, wherein the inhibitor is configured to inhibit operation of the stop/start controller when the terrain optimisation selector activates said at least one pre-configured powertrain operating mode which includes selecting the second ride height setting.

10. A powertrain control system according to claim 1, wherein the inhibitor is provided in said stop/start controller; or the inhibitor is separate from the stop/start controller.

11. A powertrain control system according to claim 1, comprising a processor for monitoring one or more driving characteristics of the vehicle to determine when the second ride height setting should be selected.

12. A powertrain control system according to claim 11, wherein the inhibitor is configured to inhibit operation of the stop/start controller when the processor determines that the second ride height setting should be selected.

13. A vehicle comprising an internal combustion engine, an adjustable suspension system and a powertrain control system according to claim 1.

14. A method of operating a motor vehicle comprising an internal combustion engine and an adjustable suspension system, the method comprising:
 operating the engine in a stop/start mode when a first ride height setting is selected for the suspension system; and
 inhibiting the stop/start mode when a second ride height setting is selected for the suspension system.

15. A method according to claim 14, wherein the engine is re-started if the second ride height setting is selected while the engine has been stopped by the stop/start mode.

16. A method according to claim 14, wherein pre-configured powertrain operating modes are user selectable; the stop/start mode being inhibited when a pre-configured operating mode is activated which is configured to select the second ride height setting for the suspension system.

17. A method according to claim 14, comprising monitoring one or more driving characteristics of the vehicle and inhibiting the stop/start mode when it is determined that the second ride height setting of the suspension system should be selected.

18. A method according to claim 14, wherein the second ride height setting is associated with a greater ride height than the first ride height setting.

\* \* \* \* \*